United States Patent

Houte et al.

[11] Patent Number: 5,905,231
[45] Date of Patent: *May 18, 1999

[54] TUBULAR SHEATHING CHANNEL TO ENCASE BUNCHED CABLES

[75] Inventors: Bernard Houte, Meylan; Jean-Jacques Legat, St.. Jean de Moirans; Antoine Raymond, Biviers; Daniel Boville, Paris, all of France; Hans-Jurgen Lesser, Rheinfelden, Germany

[73] Assignee: A. Raymond & Cie, France

[*] Notice: This patent issued on a continued prosecution application filed under 37 CFR 1.53(d), and is subject to the twenty year patent term provisions of 35 U.S.C. 154(a)(2).

[21] Appl. No.: 08/669,888

[22] Filed: Jun. 20, 1996

[30] Foreign Application Priority Data

Jun. 21, 1995 [DE] Germany ............................ 195 22 405
Feb. 29, 1996 [DE] Germany ............................ 196 07 559

[51] Int. Cl.$^6$ ...................................................... H02G 3/04
[52] U.S. Cl. ............................ 174/68.3; 174/95; 428/217; 428/156; 138/165; 138/166
[58] Field of Search ....................................... 138/110, 162, 138/166, 165, 158; 428/59, 35.1, 36.5, 36.9, 217, 156; 174/68.3, 106, DIG. 11, 138 G, 95, 96, 97, 98, 101, 72 C, 99 E, 92

[56] References Cited

U.S. PATENT DOCUMENTS

| | | | |
|---|---|---|---|
| 590,374 | 9/1897 | Osburn | 174/68.3 |
| 1,730,612 | 10/1929 | Hotchkiss | 285/330 |
| 3,110,754 | 11/1963 | Witort et al. | 174/70 R |
| 3,356,245 | 12/1967 | Little | 174/92 |
| 3,404,268 | 10/1968 | Fowler | 362/382 |
| 3,757,031 | 9/1973 | Izraeli | 174/138 F |
| 4,096,349 | 6/1978 | Donato | 174/68.3 |
| 4,169,966 | 10/1979 | Casati | 174/92 |
| 4,181,814 | 1/1980 | Smith | 174/92 |
| 4,484,020 | 11/1984 | Loof et al. | 174/68.3 |
| 4,576,846 | 3/1986 | Noel | 428/36.5 |
| 4,733,019 | 3/1988 | Pichler et al. | 174/92 |
| 4,860,799 | 8/1989 | Van Noten | 138/167 |
| 4,865,890 | 9/1989 | Erlichman | 28/35.1 |
| 4,865,893 | 9/1989 | Kunze et al. | 428/36.9 |
| 4,970,351 | 11/1990 | Kirlin | 174/68.3 |
| 5,160,811 | 11/1992 | Ritzman | 174/68.3 |

FOREIGN PATENT DOCUMENTS

| | | | |
|---|---|---|---|
| 0223424 | 10/1986 | European Pat. Off. | |
| 1310419 | 3/1973 | United Kingdom | 174/68.3 |

*Primary Examiner*—Hyung-Sub Sough
*Assistant Examiner*—Kamand Cuneo
*Attorney, Agent, or Firm*—Gifford, Krass, Groh, Sprinkle, Anderson & Citkowski, P.C.

[57] ABSTRACT

A tubular sheathing channel assembly for housing bunched cables. The assembly includes a longitudinally slit sheathing wall of elastic plastic material and includes a pair of projections which are molded on along the slits (2) and which are formed with an L-shaped cross-section, and which are embraced by C-shaped clamp members. Clamp walls (13) of the clamp member (5) are guided on the projections (4) such that they may be moved in longitudinal direction and are equipped with fastening portions (6) in order to anchor the sheathing wall (1) on a carrier plate (21). The projections (3) preferably are equipped with interlockable groove and tongue (10) and (11) on the inside walls (9).

10 Claims, 3 Drawing Sheets

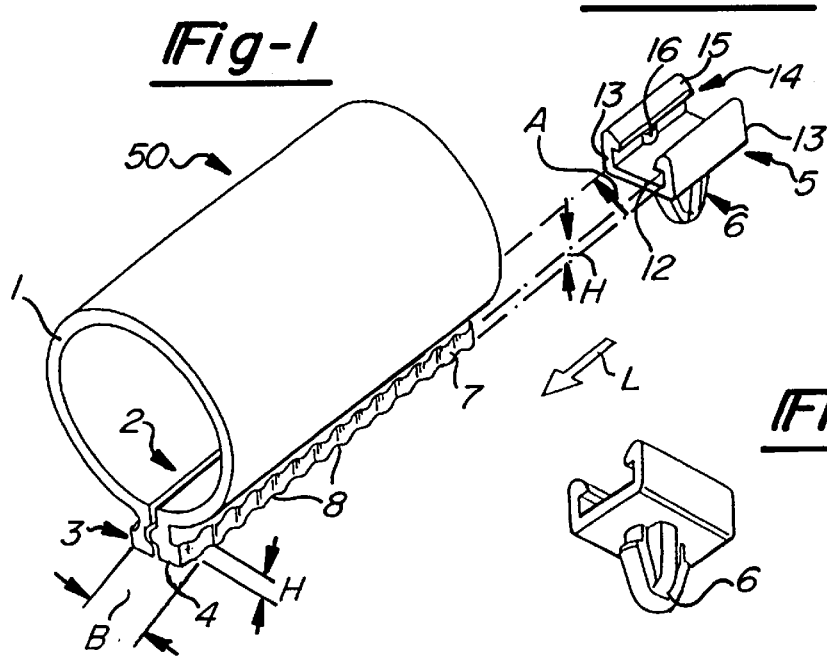
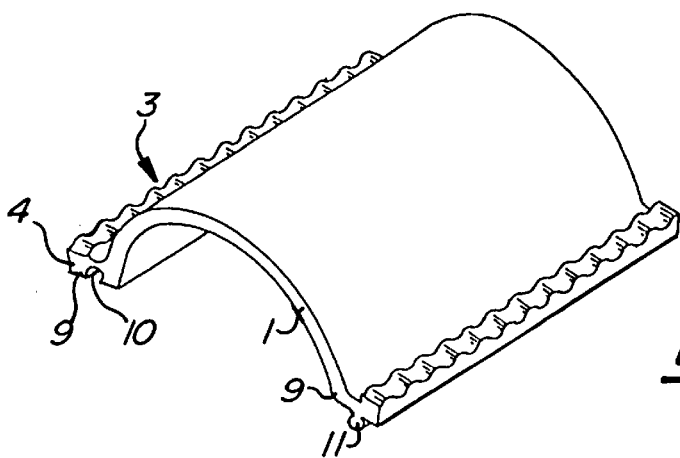
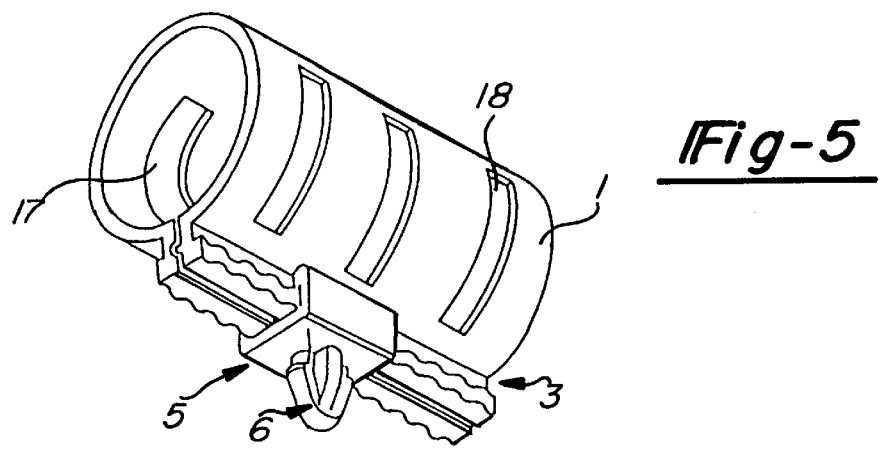

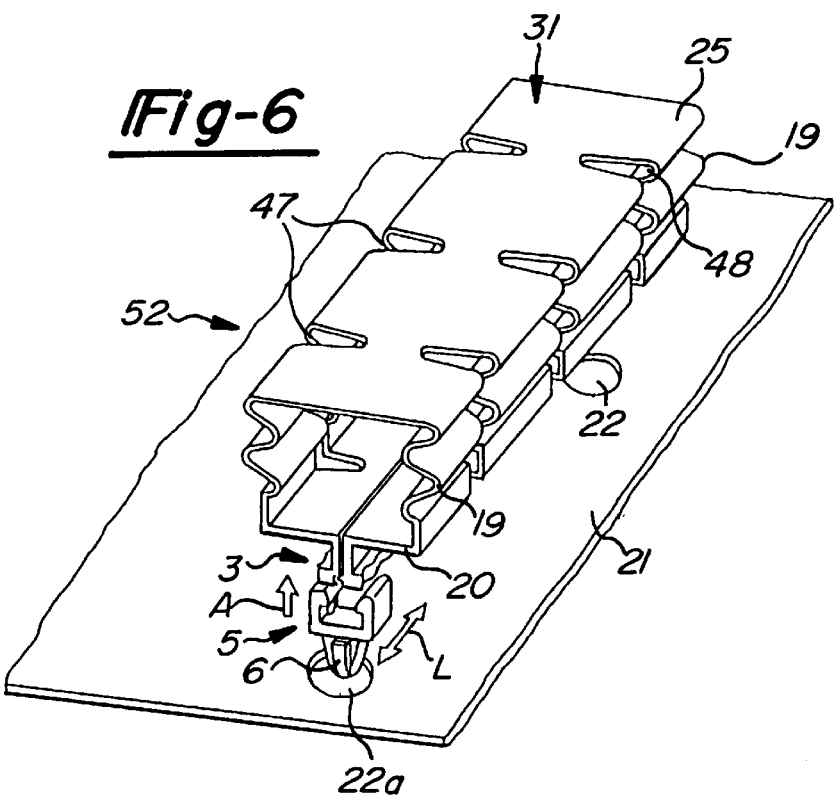
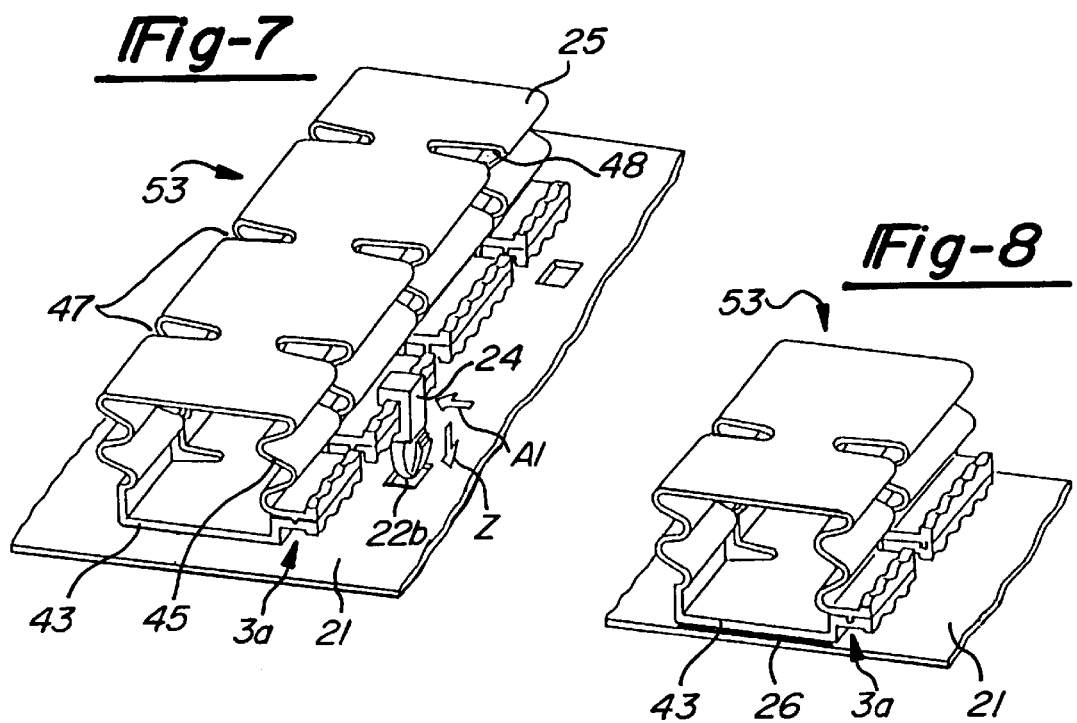

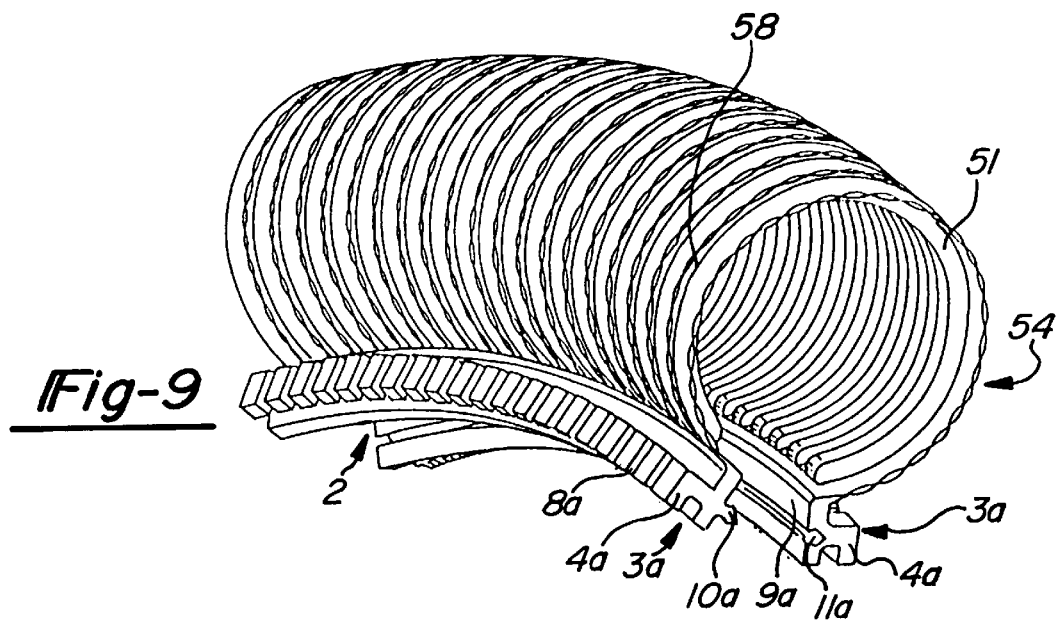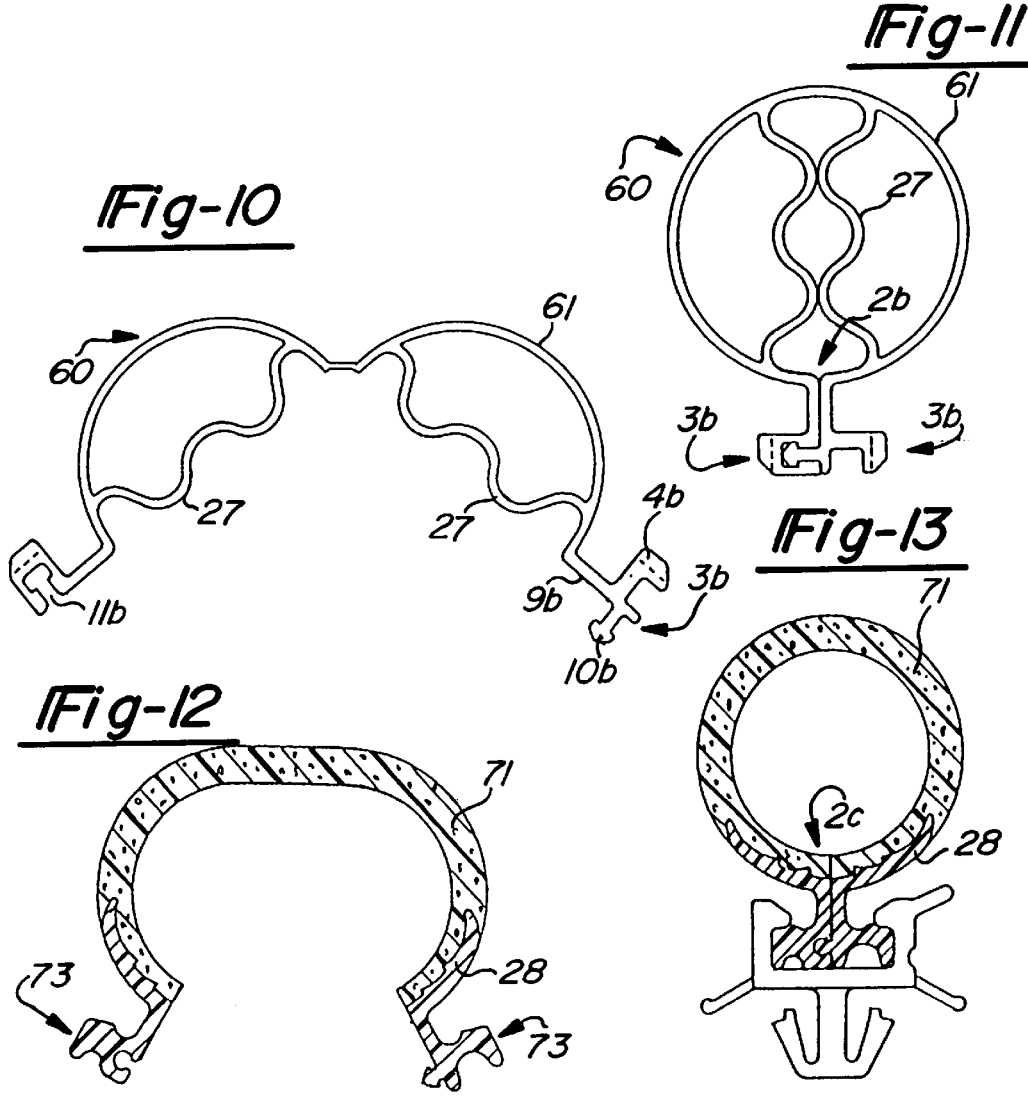

5,905,231

TUBULAR SHEATHING CHANNEL TO ENCASE BUNCHED CABLES

FIELD OF THE INVENTION

The invention relates to a tubular sheathing channel of elastic plastic material for mounting a wire harness or bunched cables.

BACKGROUND OF THE INVENTION

Sheathing channels are used in the production of motor vehicles to install bunched cables or a wiring harness. Sheathing channels protect the bunched cables to be installed against outside influences between the points of connection. Another important advantage is that the wiring harness may be supplied as a unit for installation and may be positioned and connected quickly in the motor vehicle.

The wiring harness or bunched cables are first fastened or bundled with traditional clips, tie wraps or other holding elements which are then anchored to the vehicle body sheet in holes or on pins or on other projections in a traditional manner.

Fastening with two different devices for holding or bundling and for attachment is relatively cumbersome resulting in a high installation expenditure. Additionally, a high degree of manual dexterity and concentration on the part of the installer on the assembly line is required. Additional bundling devices are frequently necessary to bind the cables, which are loosely encased by the sheath, into a tight bundle, which also costs time and, therefore, money.

Finally, because the thickness of the bunched cables varies from place to place, the carrier plate usually is unevenly formed and that along the sheath, cables may constantly be added or removed, and the shell must be equipped with respective indentations or recesses at the corresponding locations.

It is an object of the invention to design the above mentioned sheathing channel for bunched cables such that the bunched cables are encased, and may be fastened or anchored, quickly and easily in predetermined attachment locations. It is a further object of the invention that the cables may be adjusted to the uneven carrier surface or to the predetermined installation line respectively. It is an additional object of the invention to provide that the installed bunched cables are held by the sheath with as little play as possible.

These objects are solved according to the invention in that the walls of the clamps are guided on the legs of a tubular sheath such that they may be moved longitudinally, and that the clamps are equipped with fastening agents in order to anchor the sheathing wall on a carrier plate.

Additional characteristics of the invention are described herein while the design of the clamps and the legs of the projections simplifies the installation of the encased bunched cables because clamps may be locked in predetermined positions along the projection.

Due to the meshing of the groove and tongue when the L-shaped projections are joined together, the legs are located so that the clamps can easily be pressed onto projections along the channel axis, or pushed on from the side. The design includes groove and tongue shapes which permits the two projections to be locked immediately after sheathing the bunched cables which makes plugging in the clamps during preinstallation even simpler.

Recesses in the sheath wall permit the encased bunched cables to be slightly bent to the side on the installation surface. In addition, the slits or openings also offer the advantage that individual cables may be attached or removed.

Accordion-like folds of the sheathing wall provide an extendable sheathing space so that the bunched cables, having varying bundle diameters, are always tightly encased, with as little play as possible. Again, the recesses in the sheathing wall in the area of the accordion-like folds advantageously permit separation of a portion of the sheathing tube which is continuously extruded and rolled onto a roll, at any desired location and, if necessary, to be used as individual straps.

In order to mount the sheathing channel as tightly as possible on the carrier plate, it is an additional advantage if the bottom of the sheathing wall is also designed to be flat and with the locking projections arranged on a side wall. The bottom may be provided with an adhesive layer such as a double sided adhesive strip, to attach the sheath on the carrier plate. In this way the lateral anchoring by the holding clamps may be completely eliminated.

BRIEF DESCRIPTION OF THE DRAWINGS

The drawing shows several embodiments of the sheathing channel according to the invention and will be explained in more detail below. Shown are:

FIG. 1 is a perspective view of a tubular sheathing channel in closed position, FIG. 2 is a perspective view of a holding clamp with lock cams seen from above, FIG. 3 is a perspective view of the same holding clamp seen from below, FIG. 4 is a perspective view of the sheathing channel in an open position at the time of supply, FIG. 5 is a perspective view of a first alternative embodiment of the sheathing channel with lateral openings in the wall, FIG. 6 is a perspective view of a second preferred embodiment of a sheathing channel with an accordion-like sheathing wall and lock profiles under a base wall, FIG. 7 is a third preferred embodiment of a sheathing channel with laterally attached lock projections and laterally holding clamp, FIG. 8 is a perspective view of the third preferred embodiment of the same sheathing channel as in FIG. 7, however, the base wall is mounted with a dual acting adhesive layer, FIG. 9 is a perspective view of a fourth preferred embodiment having a sheathing channel with a sheathing wall which is corrugated, FIG. 10 is a cross-sectional view of a fifth preferred embodiment of a sheathing channel with elastic separating walls on the inside shown in open position at the time of supply, FIG. 11 is a cross-sectional view of the fifth preferred embodiment of the same sheathing channel shown in a closed position, FIG. 12 is a cross-sectional view of a sixth alternative preferred embodiment of a sheathing channel with a foamed sheathing wall shown in open position as supplied at the time of supply, and FIG. 13 is a cross-sectional view of the sixth preferred embodiment of the same sheathing channel shown in closed position with a fastening clamp.

DETAILED DESCRIPTION OF THE PREFERRED EMBODIMENTS

The tubular sheathing channel shown in the drawings is made of elastic plastic material and serves to encase bunched cables or wire harnesses for attachment on carrier plates.

The sheathing channel 50 according to FIGS. 1 and 2 consist of a longitudinally slit sheathing wall 1 and of projections 3 having an L-shaped cross-section having a leg portion 4 which are molded along a slit 2. A C-shaped clamp 5 is guided on the leg portions 4 such that the clamp 5 may be moved longitudinally. The clamp 5 is equipped with a mounting anchor 6 to anchor the sheathing channel on a carrier plate 21.

The leg portion 4 which projects at right angles from the projections 3 are provided with wave-shaped indentations 8 on outer edges 7 of the leg portions. The projections 3 have inside walls 9 which are facing each other The inside walls 9 are equipped with meshing groove 10 and tongue 11 which are preferably designed to be interlockable (FIG. 4).

The C-shaped clamp 5 consists, as shown in FIGS. 2 and 3, of a base plate 12 with two laterally molded clamp walls 13, having upper rims. The clamp walls 13 are equipped with opposed locking edges 14. The distance "a" between the clamp walls 13 corresponds to the total width "B" of the leg portions 4 and the inside height "h" of the locking edges 14 from the base plate 12 corresponds to the height "H" of the leg portions 4. Additionally, the locking edges 14 are equipped with entrance surfaces 15 which are angled inwardly towards each other and towards the center portion of the clamp so that the clamp 5 may easily be pressed onto the closed projections 3 from the outside with elastic deformation of the clamp walls 13.

The clamp walls 13 are equipped with approximately semi-circular lock cams 16 which project toward the inside of the clamp and which correspond to the depth of the indentations 8 and act together with these such that the clamp 5 may be moved along the leg portions 4 by elastic deformation of the clamp walls 13, to a desired lock position.

As shown in FIG. 5, a first alternative preferred embodiment, the sheathing wall 1 may be equipped with recesses or openings 17 and 18 on both sides of the projection 3 at regular intervals and cut normal to the longitudinal or axial direction of the sheathing wall 1, which makes bending easier when the encased bunched cables are installed. The openings 17 and 18 additionally make it possible to add individual cables to the bundle or remove cables from the bundle, after the channel is installed.

A second alternative preferred embodiment of the sheathing channel 52 is shown in FIG. 6. The sheathing wall 31 consists of a flat upper wall 25 with side walls having accordion-like folds 19 and a longitudinally slit bottom wall 20. As in the embodiments in FIGS. 1 and 5, the sheathing channel is equipped with two interlockable projections 3 which are projecting downward. Below the lock projections 3 is a clamp 5 which, subsequent to being pressed onto the joined lock projections 3, may be moved in the direction of the arrow L along the leg portions 4 and may be locked in the indentations 8 via the cams 16 of the clamp.

The underside of the clamp 5 is equipped with a mounting anchor 6 which may be guided into a mounting hole 22a of a carrier plate 21 where it may be anchored. The mounting anchor 6, which in this example is equipped with spring-like expansion legs which may be pressed together, may have any shape suitable to be mounted in a hole, on a rim or on a pin.

FIG. 7 shows a third preferred embodiment of an accordion-like sheathing channel 53 in which the bottom wall 43 is closed and designed to be planar and the lock projections 3a are laterally molded thereon to side wall 45. A clamp 24 is pressed on from the side in the direction of the arrow "A", and is pushed into the hole 22b the carrier plate 21 with the mounting anchor 6 in the direction of the arrow "Z". Slit openings 47 and 48 cut through the side walls 45, the lock projections 3a and partially through the bottom wall 23 and the upper wall 25 so that the channel 53 is laterally flexible and adjustable when it is installed on the plate surface.

As shown in FIG. 8, the bottom wall 43 of the sheathing channel 53 is equipped with an adhesive layer 26, which is adhered directly to the carrier plate 21 so that a lateral clamp 5 or 24 such as in FIGS. 6 and 7 is not required.

In the fourth preferred alternative embodiment shown in FIG. 9 the sheathing wall 51 is corrugated in a longitudinal direction, similar to a corrugated tube, so that the sheathing channel 54 may be curved into any desired course when the bunched cables are installed, and therefore may be well adjusted to the prevailing circumstances and to the unevenness of the carrier plate. The corrugated sheathing wall 51 may be simply produced by extrusion. Indentations 8a are preferably provided in the leg portions 4a of the projections 3a at the same place axially as the circumferentially extending wave troughs 58 in the sheathing wall 51. Projections 5b and 3a include tongue 10a and groove projection 11a. The inside walls 9a of the projections 3a are preferably provided with an interlocking groove 10a and tongue 11a.

FIGS. 10 and 11 show a fifth preferred alternative embodiment of a sheathing channel 60 with elastically deformable separation walls 27 which are molded on both sides of the slit 2 and which cut wave-like through the inside space of the channel. The separation walls 27 are supported in an area of the sheathings located opposite the slit 2b. The other end of the separation walls 27 may either abut on the inside of the wall 61 or the end may also be, as shown in the drawing, molded onto the inside of the wall 61. FIG. 10 shows the sheathing channel 60 in extruded condition in which it is supplied. In FIG. 11 the sheathing channel 60 is closed. As in the earlier embodiments, the sheathing channel 60 includes projections 3b extending from the wall 61 on each side of the slit 2b. The projections 3b include leg portions 4b. The inside walls 9b of the projections 3b are preferably provided with an interlocking groove 10b and tongue 11b.

In the sixth preferred alternative embodiment shown in FIGS. 12 and 13, the sheathing wall 71 consists of foamed, thermoplastic elastomer, such as santoprene, while the L-shaped projections 73 are made of a hard plastic material, such as polypropylene.

These projections 73 are molded in one piece from the outside onto the soft sheathing wall 71 on both sides of the slit 2c via an inwardly serrated flange 28 so that on the inside the sheathing wall 71 restrains the bunched cables over the entire circumference.

We claim:

1. A sheathing channel assembly for securing a wire bundle to a carrier plate, said assembly comprising:

a sheathing member having a tubular wall and a longitudinal slit, said tubular wall defining an interior space for said wire bundle, said longitudinal slit formed between a pair of L-shaped projections, each of said projections having a leg portion extending in a direction away from said slit, said leg portion having an edge having a plurality of indentations extending inwardly into said edge, said edge and said plurality of indentations extending in a longitudinal direction along said edge;

a clamp having a pair of walls spaced apart to engage said pair of leg portions of said sheathing member therebetween, said clamp adapted to slide along said pair of leg portions in said longitudinal direction over said plurality of indentations, said clamp further having a lock member projecting inwardly from each of said clamp walls to engage any one of said plurality of indentations of said leg portions to hold said clamp in a desired position along said edge, said clamp further having fastening means for mounting said clamp to said carrier plate.

2. The sheathing channel assembly according to claim 1 wherein one of said pair of projections has an inside wall with a groove and another of said pair of projections has an inside wall having a flange formed to interlock with said groove of said one of said pair of projections.

3. The sheathing assembly channel according to claim 1, wherein said tubular wall has a plurality of openings spaced apart and extending transversely to the direction of said longitudinal slit.

4. The sheathing channel assembly according to claim 1, wherein said tubular wall further comprises a plurality of accordion-like folds having recesses extending in the direction of said longitudinal slit to permit said wall to be folded inwardly toward said pair of projections.

5. The sheathing channel assembly according to claim 4, said tubular wall further comprising a pair of side walls extending between a top and a bottom wall, said bottom wall adapted to be mounted adjacent said carrier plate, a plurality of spaced apart slits which project partially into said plurality of folds of said tubular wall.

6. The sheathing channel assembly according to claim 1, wherein said tubular wall further comprises a pair of side walls extending between a top and a bottom wall, said projections extending outwardly from one of said pair of side walls in a direction parallel to a surface of said bottom wall.

7. The sheathing channel assembly according to claim 1, wherein said tubular wall comprises a plurality of corrugations formed to permit folding with respect to said longitudinal direction.

8. The sheathing channel assembly according to claim 1, comprising a pair of separation walls extending in the direction of said longitudinal slit through said interior space formed within said tubular wall.

9. The sheathing channel assembly according to claim 1, wherein the sheathing wall comprises a foamed, thermoplastic elastomer, and said pair of projections are formed of a hard plastic material.

10. The sheathing channel assembly according to claim 8, wherein each of said projections has an inwardly serrated flange formed for attachment to said tubular wall.

* * * * *

UNITED STATES PATENT AND TRADEMARK OFFICE
CERTIFICATE OF CORRECTION

PATENT NO. : 5,905,231
DATED : May 18, 1999
INVENTOR(S) : Houte et al.

It is certified that error appears in the above-identified patent and that said Letters Patent is hereby corrected as shown below:

Column 1, lines 31-36 -  the paragraph beginning "Finally..." and ending "corresponding locations."

Column 1, line 62 - Replace "permits" with --permit--.
Column 2, line 22 - Replace "drawing shows" with -- drawings show--.
Column 2, line 40 - Insert -- installed-- after "laterally" (second occurrence).
Column 3, line 2 - Replace "consist" with --consists--.
Column 3, line 9 - Replace "portion" with --portions--.
Column 3, line 9 - Replace "projects" with --project--.
Column 4, line 1 - Replace "A" with --$A_1$--.
Column 4, line 3 - Insert --are-- after "48".
Column 4, line 9 - Delete "," after "26".
Column 4, lines 22-23 - Delete "Projections 5b and 3a include tongue 10a and groove projection 11a".
Column 4, line 29 - Replace "2" with --2b--.
Column 4, line 31 - Replace "sheathings" with --sheathing--.
Column 4, line 45 - Insert --a-- after "of".
Column 4, line 51 - Delete "on".

Signed and Sealed this

Fifteenth Day of February, 2000

Attest:

Q. TODD DICKINSON

Attesting Officer   Commissioner of Patents and Trademarks